US012342134B2

(12) United States Patent
Dickel

(10) Patent No.: US 12,342,134 B2
(45) Date of Patent: Jun. 24, 2025

(54) METHOD FOR OPERATING A HEARING DEVICE, HEARING DEVICE AND SYSTEM INCLUDING A HEARING DEVICE AND A CHARGING DEVICE

(71) Applicant: Sivantos Pte. Ltd., Singapore (SG)

(72) Inventor: Thomas Dickel, Buttenheim (DE)

(73) Assignee: Sivantos Pte. Ltd., Singapore (SG)

( * ) Notice: Subject to any disclaimer, the term of this patent is extended or adjusted under 35 U.S.C. 154(b) by 157 days.

(21) Appl. No.: 17/903,217

(22) Filed: Sep. 6, 2022

(65) Prior Publication Data

US 2023/0072386 A1 Mar. 9, 2023

(30) Foreign Application Priority Data

Sep. 6, 2021 (DE) ..................... 10 2021 209 822.3

(51) Int. Cl.
*H04R 25/00* (2006.01)

(52) U.S. Cl.
CPC ........... *H04R 25/556* (2013.01); *H04R 25/30* (2013.01); *H04R 2225/31* (2013.01); *H04R 2225/33* (2013.01)

(58) Field of Classification Search
CPC ...... H04R 25/00; H04R 25/556; H04R 25/30; H04R 2225/31; H04R 2225/33
See application file for complete search history.

(56) References Cited

U.S. PATENT DOCUMENTS

| | | | | |
|---|---|---|---|---|
| 6,445,233 | B1 * | 9/2002 | Pinai | H03G 7/06 327/134 |
| 8,098,862 | B2 | 1/2012 | Koch et al. | |
| 10,321,246 | B2 | 6/2019 | Flaig et al. | |
| 10,575,106 | B1 * | 2/2020 | Bergmann | H04R 25/505 |
| 2008/0232625 | A1 * | 9/2008 | Koch | H04R 25/00 381/323 |
| 2022/0181911 | A1 * | 6/2022 | Partovi | H02J 7/0047 |

FOREIGN PATENT DOCUMENTS

| | | | |
|---|---|---|---|
| DE | 102007013420 | A1 | 10/2008 |
| DE | 102014218053 | A1 | 3/2016 |
| EP | 1973375 | A2 | 9/2008 |
| JP | 2009021910 | A | 1/2009 |

* cited by examiner

*Primary Examiner* — Suhan Ni
(74) *Attorney, Agent, or Firm* — Laurence A. Greenberg; Werner H. Stemer; Ralph E. Locher

(57) ABSTRACT

A method for operating a hearing device having a charging terminal with two electrical contacts includes detecting a decrease in the voltage applied to one of the two contacts. An operating mode of the hearing device is set based on the time profile of the decrease. A hearing device and a system including a hearing device and a charging device, are also provided.

7 Claims, 2 Drawing Sheets

METHOD FOR OPERATING A HEARING DEVICE, HEARING DEVICE AND SYSTEM INCLUDING A HEARING DEVICE AND A CHARGING DEVICE

CROSS-REFERENCE TO RELATED APPLICATION

This application claims the priority, under 35 U.S.C. § 119, of German Patent Application DE 10 2021 209 822.3, filed Sep. 6, 2021; the prior application is herewith incorporated by reference in its entirety.

FIELD AND BACKGROUND OF THE INVENTION

The invention relates to a method for operating a hearing device. The invention also relates to a hearing device and to a system that includes a hearing device and a charging device. The hearing device includes a charging terminal with two electrical contacts.

Persons who suffer from a reduction in their hearing often use a hearing aid. In that case, ambient sound is usually captured using an electromechanical sound transducer. The electrical signals produced based on the ambient sound are amplified by using an amplifier circuit and are introduced into the person's auditory canal by using a further electromechanical transducer in the form of a receiver. The detected sound signals are also usually processed, for which purpose a signal processor of the amplifier circuit is usually used. The amplification is matched in that case to a possible hearing loss of the person wearing the hearing aid.

Electrical energy is required for operating both the converter and the amplifier circuit. That energy is usually provided in the form of a battery disposed in a housing of the hearing aid. The person using the hearing aid, that is to say the person wearing the hearing aid, is thus free to move. When the battery is empty, it needs to be replaced. The housing usually has a flap through which the battery is accessible for that purpose.

The disadvantage thereof is that foreign particles or moisture can get into the housing due to leakage points and therefore may damage the components of the hearing aid that are disposed there, such as the amplifier circuit. As a result, a relatively extensive seal is required. In that case, construction costs and manufacturing costs are increased due to the relatively small amount of space available. Due to the relatively small dimensions of the flap, further aids are usually required for handling and incorrect handling by the person is not excluded.

One alternative therefore provides for using a rechargeable battery. If the battery is empty, it is only necessary to recharge it in order to be able to continue operation without disassembly being needed. As a result, it is possible to configure the housing to be substantially leak-tight and handling is simplified. The hearing aid usually has a charging terminal with two electrical contacts for charging. Those electrical contacts interact with two mating contacts of a charging device. For example, in that case, the mating contacts are mechanically contact-connected directly to the contacts, with the mating contacts being separated from the contacts when charging has finished. As an alternative thereto, the contacts and mating contacts act on one another through electrical coils, in such a way that the energy exchange between the hearing aid and the charging device takes place inductively. The charging device itself is usually connected to a supply network by a plug. The voltage present between the mating contacts and used to charge the hearing device is produced based on the voltage provided by the supply network.

When the hearing device is charged, the user usually removes it from the charging device to use it immediately. So that convenience for the user is increased, the hearing device is already set to a working mode when it is removed from the charging device. Removal from the charging device is usually detected based on a decrease in the voltage applied to the contacts, the interaction of the contacts with the mating contacts being broken off when removed from the charging device. However, it is also possible for the plug of the charging device to be disconnected from the supply network. As a result, the voltage applied to the mating contacts decreases and consequently the voltage applied to the contacts also decreases. In that case, however, the hearing device usually should not be used but instead it should be operated in as energy-saving a manner as possible until it is actually used. In order for the hearing device not to be set to working mode, it is additionally necessary to determine whether the hearing device is still connected to the charging device when the voltage applied to the contacts decreases. For that purpose, for example a third contact is used or provision is made of a sensor, such as a Hall sensor, which can be used to detect an electrical field produced by the meeting contacts. As a result, however, additional components are provided, which increases manufacturing costs.

SUMMARY OF THE INVENTION

It is accordingly an object of the invention to provide a method for operating a hearing device, a hearing device and a system including a hearing device and a charging device, which overcome the hereinafore-mentioned disadvantages of the heretofore-known methods, devices and systems of this general type and in which, in particular, convenience is increased and/or manufacturing costs are reduced.

With the foregoing and other objects in view there is provided, in accordance with the invention, a method for operating a hearing device having a charging terminal with two electrical contacts, which includes detecting a decrease in the voltage applied to one of the two contacts, and setting an operating mode of the hearing device based on the time profile of the decrease.

With the objects of the invention in view, there is also provided a hearing device including a charging terminal with two electrical contacts, which is operated in accordance with the method of the invention.

With the objects of the invention in view, there is concomitantly provided a system including a charging device having two electrical mating contacts that are electrically connected by a capacitance, and the hearing device according to the invention.

Advantageous developments and configurations are the subject matter of the respective dependent claims.

The method is used to operate a hearing device. The hearing device is an earphone or includes an earphone, for example. However, the hearing device is particularly preferably a hearing aid. The hearing aid is used to support a person who is suffering from a reduction in their hearing. In other words, the hearing aid is a medical device that is used to compensate for a partial loss of hearing, for example. The hearing aid is, for example, a "receiver-in-the-canal" (RIC) hearing aid, an "in-the-ear" hearing aid, an "in-the-canal" (ITC) hearing aid or a "complete-in-canal" (CIC) hearing aid, a pair of hearing glasses, a pocket hearing aid, a bone conduction hearing aid or an implant. The hearing aid is alternatively a "behind-the-ear" hearing aid, which is worn behind a pinna.

The hearing device is provided and set up to be worn on the human body. In other words, the hearing device preferably includes a holding apparatus through the use of which it is possible to secure it to the human body. As an alternative or in combination, the hearing device is suitably shaped for this purpose. If the hearing device is a hearing aid, the hearing device is provided and set up to be disposed, for example, behind the ear or inside an auditory canal. In particular, the hearing device is wireless and is provided and set up to be inserted at least partly into an auditory canal.

The hearing device preferably has a hearing device housing. Substantially all of the other components of the hearing device are preferably disposed in the hearing device housing, at least preferably any electronics, such as an amplifier circuit. For example, the hearing device housing is made of one piece or particularly preferably from several component parts. The hearing device housing is suitably made from a plastic, in particular in a plastic injection molding process. There is thus a relatively great degree of design freedom. The hearing device housing weight is also not overly increased.

For example, a microphone, that is to say in particular an electromechanical sound transducer, is disposed in the hearing device housing. The microphone is used to detect ambient sound and is suitable, in particular provided and set up, for this purpose. In particular, the microphone is connected electrically and/or in terms of signal technology to any electronics, in particular the amplifier circuit, or other electrical/electronic components of the hearing device. The amplifier circuit is used to suitably process the signals detected by using the microphone.

The hearing device particularly preferably includes another electromechanical sound transducer, in particular a receiver, through the use of which the signals processed by using the possible amplifier circuit are output. For example, the receiver is likewise disposed in the hearing device housing or in another housing. For example, in this case, the two housings are connected in terms of signal technology by using a line, in particular if the hearing device is an RIC hearing device.

The hearing device includes a charging terminal, with it being possible to feed electrical energy into the hearing device through the charging terminal. For this purpose, the charging terminal has two electrical contacts, which are also referred to purely as contacts in the rest of the text. When the hearing device is charged, when electrical energy is fed in or at least when there is interaction with a charging device, a voltage is applied to the charging device. The charging device is used in this case to charge the hearing device, that is to say to supply the hearing device with electrical energy. The charging device is suitable, in particular provided and set up, for this purpose.

In this case, the charging terminal is, for example, of mechanical configuration, and the two electrical contacts are formed, for example, by using pogo pins, a mechanical plug or an electrically conductive circuit board, or in each case include at least these. In this case, the electrical contacts are, for example, introduced directly into a possible wall of the hearing device housing or are located in a recess that is covered by a flap, for example. As an alternative thereto, the two electrical contacts are contact-connected to an electrical coil, and the charging takes place wirelessly. In this case, a rectifier, such as a diode rectifier, is expediently disposed between the electrical contacts and the (electrical) coil, in such a way that a DC voltage is applied to the electrical contacts if the hearing device interacts with the charging device. In this case, a capacitor or another capacitance is typically preferably connected between the contacts, the capacitor or capacitance being used to stabilize the voltage. The voltage applied to the electrical contacts is thus substantially constant when the interaction with the charging device remains the same.

The charging device preferably has two mating contacts. If the charging takes place mechanically, for example by using a cable, each one of the mating contacts mechanically bears directly against a respectively assigned contact. When the charging takes place inductively, for example, the mating contacts are electrically contact-connected in particular to a coil, preferably through an inverter. In this case, a DC voltage is expediently applied to the mating contacts.

The hearing device preferably includes an energy store, through the use of which the energy supply is provided. The energy store is expediently used to energize any electronics/sound transducers. The energy store is suitably disposed inside the possible hearing device housing. The energy store is expediently rechargeable and is preferably a rechargeable battery. In particular, the energy store is contact-connected to the two electrical contacts, for example directly or through a possible charging circuit. The charging circuit in this case preferably includes a voltmeter, which is configured for example as an A/D converter or at least includes same. In particular, the charging of the energy store through the charging terminal is regulated or at least controlled by the charging circuit. In this way, it is possible to increase a number of possible charging cycles.

The method makes provision for a decrease in the voltage applied to the two contacts to be detected. The voltage applied to the electrical contacts is expediently a DC voltage. In this case, the voltage is expediently applied to the two contacts due to the interaction with the charging device. In this case, the hearing device is charged due to the interaction, for example. In order to provide the interaction based on which the voltage applied to the two contacts is present, the hearing device, expediently the charging terminal, bears against the charging device, in particular if the charging takes place wirelessly. As an alternative thereto, in particular, a mating plug or the like is plugged into the charging terminal in such a way that corresponding mating contacts mechanically bear directly against the contacts of the charging terminal.

After the voltage is applied to the two contacts, that is to say between them, it is detected that the voltage decreases. In this case, in particular, an amplitude of the applied voltage decreases, in particular if an AC voltage is applied to the two contacts. However, a DC voltage is particularly preferably applied to the contacts and the magnitude of the voltage reduces during the decrease.

In another working step, the time profile of the decrease of the voltage is detected and an operating mode of the hearing device is set depending on this. In particular, in this case, one of several operating modes of the device is selected and the hearing device is subsequently operated according to the selected and set operating mode. For this purpose, in particular, certain components of the hearing device are energized differently.

When the interaction between the charging device and the hearing device is ended, in particular because the hearing device is removed from the charging device, this is done relatively abruptly so that the voltage applied to the two contacts decreases relatively quickly. On the other hand, when the charging device is disconnected from the possible supply network or at least the charging device has finished being energized, operation of the charging device is still partly maintained for a short time period due to inductances and/or capacitances present in the charging device, with the amount of energy exchanged between the charging device and the hearing device decreasing, however. As a result, the voltage applied to the two contacts decreases in another way. Since the operating mode of the hearing device is set depending on the time profile of the decrease, it is thus set depending on how the interaction is ended. Therefore, the hearing device is subsequently operated differently depending on whether the hearing device is removed from the charging device or whether the energization of the charging device itself is ended. The needs of the user of the hearing device are thus addressed by the method in such a way that convenience is increased. In this case, however, no additional components, such as sensors, are required, which reduces manufacturing costs.

For example, to determine the time profile, the voltage is detected only at two different times. In this case, for example, the time interval between the two times is predetermined and the voltage is detected at the two different times. The respective time profile is inferred depending on the extent of the difference in the voltage at the two times. As an alternative thereto, for example, the values of the voltage are predetermined and the time profile is on the basis of the time interval between the times at which the voltage corresponds to the predetermined values. Since only two measurements carried out in both variants, or at least the time profile is determined only based on two different values, complexity and consequently also computational outlay is reduced. The method therefore saves on resources and it is possible to carry out the method even with an inefficient device.

In an alternative, to determine the time profile, the voltage is detected over a relatively long time period and an analysis is carried out. For example, the voltage is subject to a Fourier analysis. However, to determine the time profile, a temporal derivation of the voltage is particularly preferably produced. The derivation is preferably used as the time profile. For example, when the derivation has a particular maximum value, particular minimum value and/or a particular average value, a particular operating mode is used, whereas a different operating mode is used in the case of another minimum/maximum/average value. The use of the derivation increases accuracy and, for example, relatively short-term fluctuations or other interference do not lead to a different operation of the hearing device.

A standby operating mode is particularly preferably selected when the voltage decreases more slowly than a first limit value. In this case, for example, the difference between the two voltages that are detected at two different times at a determined time interval from one another is lower than a determined value through the use of which the first limit value is defined. As an alternative thereto, the first limit value is determined based on the derivation and the derivation is expediently lower than a further limit value. In the standby operating mode, for example, individual components or all of the components of the hearing device are switched off or one of the components or some of the components are operated with a comparatively low energy demand, wherein a range of functions is restricted, for example. When the voltage decreases slowly, there is still the connection to the charging device or at least the interaction therewith in such a way that it can be assumed that the charging device is no longer energized and only a residual voltage that is present is reduced. In this case, the hearing device is probably not directly subsequently used by the user and an energy demand of the hearing device is reduced due to the standby operating mode. When the user subsequently would actually like to use the device, it therefore has a comparatively high state of charge. If the hearing device has already been operated in standby mode during charging, it is expediently kept there.

As an alternative or particular preferably in combination therewith, a working mode is selected when the voltage increases more rapidly than a second limit value. For example, in this case, the difference between the two voltages that are detected at two different times that are at a constant time interval from one another is greater than a particular limit value or the derivation, in particular a minimum, maximum or average, is greater than another limit value. When the hearing device is set to working mode, some components of the hearing device that have not yet been energized are preferably energized. In particular, a control device or another circuit, in particular a microprocessor, is set to working mode from a standby operating mode. In the case of a rapid decrease, the interaction of the hearing device with the charging device is ended comparatively abruptly in such a way that it can be assumed that the hearing device has been mechanically removed from the charging device. In this case, the user would mostly like to use the device immediately and no additional actuating operations are required for this due to the method. If the hearing device has already been operated in working mode, there is in particular no change in the operating mode.

The first limit value is particularly preferably selected to be equal to the second limit value, in such a way that only one of two operating modes is selected in each case depending on the time profile of the decrease. Complexity is thus reduced and the user is able to understand the operation.

For example, the decrease is detected when an amount of energy fed into the energy store is below a particular value. However, the decrease is preferably detected when the voltage applied to the two contacts falls below a third limit value. The third limit value is expediently comparatively high and is for example between 95% and 75%, between 90% or 70% or between 85% and 80% of the voltage applied to the electrical contacts during a charging process. Due to such a third limit value, the charging process of the hearing device is not influenced in the case of fluctuations in the interaction of the charging device of the hearing device, whereas the corresponding operating mode of the hearing device is selected as early as in the case of comparatively rapid removal of the hearing device from the charging device or termination of the energization of the charging device. Only the determination of the voltage is required for the method, too, in such a way that hardware requirements are reduced.

The hearing device includes a charging terminal with two electrical contacts. For example, the charging terminal is an inductive charging terminal or is configured to be wired. In this case, the electrical contacts are in particular each adjusted correspondingly and a respective DC voltage is expediently applied to the contacts, irrespective of the respective configuration of the charging terminal when the hearing device is charged for the at least interacts with a charging device. The hearing device is operated in accordance with a method in which a decrease in a voltage applied to the two contacts is detected. An operating mode of the hearing device is subsequently set based on the time profile of the decrease.

In particular, the hearing device includes a control unit that is suitable, in particular provided and set up, to carry out the method. The control unit is formed for example by electronics that suitably also include a signal processor. The hearing device expediently includes an energy store, such as a battery, that can be charged in particular by using the charging terminal. For this purpose, the energy store is electrically connected to the charging terminal for example directly or particularly preferably by using a charging circuit. In particular, the charging terminal is a component part of the charging circuit.

An A/D converter is particularly preferably used to ascertain the time profile. The A/D converter is expediently additionally also used to evaluate the voltage applied to the electrical contacts and the beginning of the decrease of the voltage is detected in particular by using the A/D converter. The possible charging circuit is particularly preferably operated by using the A/D converter. The A/D converter thus undertakes different tasks. A corresponding A/D converter is also already present in some hearing devices, in such a way that in particular there are no additional hardware requirements. Manufacturing costs are thus not increased.

The (digital) signals produced by the A/D converter are particularly preferably evaluated by using electronics of the hearing device, for example by using a comparator. In particular, a signal processor is used for this, which is otherwise used for example to process the (acoustic) output signal, preferably if the hearing device is not charged and/or if the hearing device is in working mode.

The system includes a hearing device with a charging terminal that has two electrical contacts. The system also has a charging device that is used to charge the hearing device, namely the energy store. The charging device is suitable, in particular provided and set up, for this purpose. During operation, electrical energy is transferred to the hearing device by the charging device, in particular to an energy store of the hearing device. In summary, charging device of a hearing device is to be understood in particular as a charging device for a hearing device where the charging device is not a component part of the hearing device. In this case, the charging device and the hearing device are units/component parts of the system that are separate from one another and that can be removed from one another. In contrast, during charging, the charging device and the hearing device interact with one another.

In one embodiment, in order to produce the interaction, each mating contact is mechanically connected to a respectively assigned contact in a releasable manner and the contacts and mating contacts are made from an electrically conductive material. In an alternative thereto, the contacts and the mating contacts are each electrically contact-connected to a coil, preferably through further component parts. In particular, the mating contacts are contact-connected to the assigned coil through an inverter and the contacts are contact-connected through a rectifier. The contacts are additionally expediently electrically connected to a capacitance. In order to produce the interaction, in this case, the two coils are brought closer to one another and the inverter is operated in particular in such a way that an AC voltage is applied to the assigned coil.

The hearing device is operated in accordance with a method in which a decrease in a voltage applied to the two contacts is detected. An operating mode of the hearing device is set based on the time profile of the decrease.

The two mating contacts of the charging device are particularly preferably connected by a capacitance, through the use of which the possible inverter is expediently fed. In this case, the inverter is preferably also operated by using the voltage applied to the capacitance, in such a way that circuitry is simplified. The capacitance is particularly preferably a capacitor or includes at least one capacitor.

When the energization of the charging device changes, the inverter will continue to operate for an extended period due to the capacitance, in such a way that the voltage at the contacts decreases relatively slowly. In contrast, when the hearing device is removed from the charging device, the voltage also continues to decrease relatively quickly. Due to the capacitance, the dependency of the profile of the decrease on the type of termination of the interaction between the charging device on the device is thus increased.

The developments and advantages explained in connection with the method may also be transferred analogously to the hearing device/the system and between one another, and vice versa.

Other features which are considered as characteristic for the invention are set forth in the appended claims.

Although the invention is illustrated and described herein as embodied in a method for operating a hearing device, a hearing device and a system including a hearing device and a charging device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
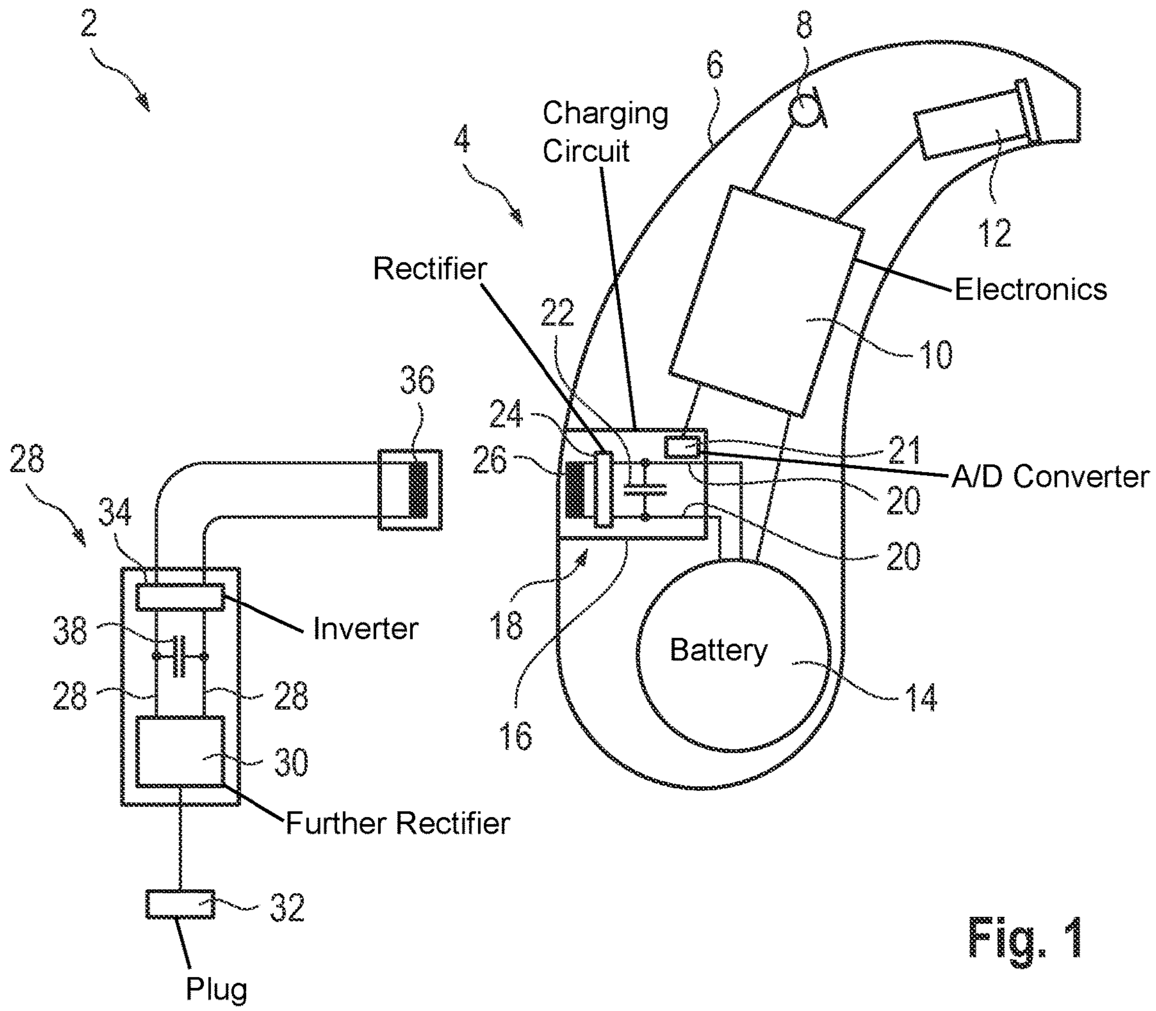
FIG. 1 is a simplified, diagrammatic, longitudinal-sectional view of a system having a hearing device and a charging device.

Referring now in detail to the figures of the drawings, in which parts that correspond to one another are denoted by the same reference signs throughout, and first, particularly, to FIG. 1 thereof, there is seen a system 2 having a hearing device 4 in the form of a hearing aid that is provided and set up to be worn behind an ear of a user (that is, a person wearing a hearing device, or a wearer). In other words, the hearing device is a "behind-the-ear" hearing device. The hearing device 4 includes a hearing device housing 6 made from a plastic in an injection-molding process. A microphone 8 is disposed inside the hearing device housing 6. The microphone 8 is coupled to electronics 10 in terms of signal technology, the electronics including a signal processing unit (not shown in any more detail) having an amplifier circuit and a signal processor. The electronics 10 are formed by circuit elements, such as electrical and/or electronic components, for example. The signal processor is a digital signal processor (DSP) and is connected in terms of signal technology to the microphone 8 through an A/D converter (not illustrated in any more detail).

A receiver 12 is coupled to the electronics 10 in terms of signal technology. During operation, an (electrical) signal provided by the electronics 10 is converted by the receiver 12 to an output sound, that is to say to sound waves. Those sound waves are introduced into a sound tube (not illustrated in any more detail), the one end of which is secured to the hearing device housing 6. The other end of the sound tube is surrounded by a dome that is disposed in an auditory canal of the user in the intended state. The electronics 10, the microphone 8 and the receiver 12 are energized by an energy store in the form of a battery 14 disposed in the hearing device housing 6.

The hearing device 4 also includes a charging circuit 16 that is electrically connected to the battery 14 and that is used to charge the battery 14. For this purpose, the charging circuit 16 includes a regulation unit (not illustrated in any more detail), through the use of which the voltage applied to the battery 14 is set. In addition, the charging circuit 16 includes a charging terminal 18 having two contacts 20. The contacts 20 are connected to the battery 14 through the regulation unit (not illustrated in any more detail). The voltage applied to the contacts 20 is detected by an A/D converter 21 and the regulation unit is operated in a manner depending thereon. The two contacts are electrically connected to one another by a capacitor 22 and fed to a rectifier 24, specifically a diode rectifier. The rectifier 24 is connected to an electrical coil 26, which is also referred to purely as a coil, and is fed by the same.

The system 2 further includes a charging device 28 having two mating contacts 28'. The mating contacts 28' are connected to another rectifier 30 and fed thereby. The further rectifier 30 in turn is fed by a plug 32 that is used to electrically contact-connect the charging device 28 to a supply network, through the use of which a DC voltage, for example at 230 V or 110 V, is fed. The two mating contacts 28' are fed to an inverter 34, through the use of which a coil 36 of the charging device 28 is fed. In addition, the two mating contacts 28' are electrically connected to one another by a capacitance 38. The capacitance 38 is in this case a capacitor.

In order to charge the hearing device 4, specifically the battery 14, the plug 32 is electrically contact-connected to the supply network and consequently the capacitance 36 is charged by the further rectifier 30. The inverter is operated by the capacitance 38 and consequently an AC voltage is applied to the coil 36 of the charging device 28. The coil 36 is placed in direct proximity to the charging terminal 18, specifically the coil 26, in such a way that an AC voltage is induced therein. This AC voltage is rectified by the rectifier 24 and smoothed by the capacitor 22, in such a way that a substantially constant (DC) voltage is applied to the contacts 20. This DC voltage is detected by using the A/D converter 21 and the regulation unit is set in a manner depending thereon, in such a way that the battery 14 is charged.

Figure 2:
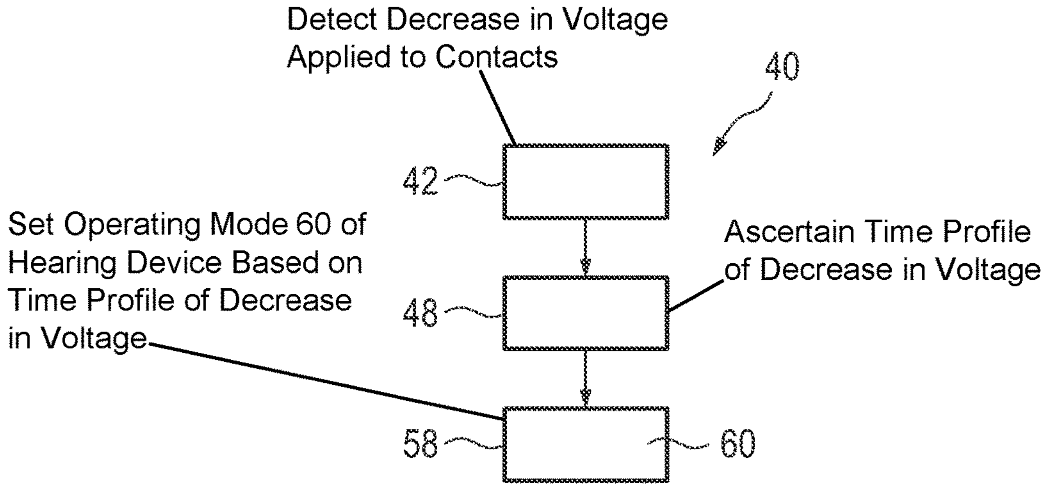
FIG. 2 is a flow diagram of a method for operating the hearing device.

The hearing device 4 is also operated in accordance with a method 40 illustrated in FIG. 2, that method being executed at least in part by the electronics 10. In a first working step 42, a decrease in a voltage 44 applied to the two contacts 20 is detected, the time profile thereof being shown by way of example in FIG. 3. In this case, the voltage 44 being applied is detected by the A/D converter 21 and the produced (digital) signals are supplied to the electronics 10, through the use of which the signals are evaluated. When the voltage 44 falls below a third limit value 46, which corresponds to 80% of the voltage 44 required or usually applied during charging of the battery 14, the decrease is detected in this case. In other words, the applied voltage 44 is monitored even during charging by the A/D converter 21 and the electronics 10.

In an adjoining second working step 48, a time profile 50 of the decrease in the voltage 44 is ascertained. In one embodiment, a temporal derivation 52 of the voltage 44 is produced for this purpose. In an alternative, to determine the time profile 50, after the decrease has been detected, the voltage 44 is detected at two different times 54, wherein the first of the times 54 coincides with the time at which the voltage 44 differs from the third limit value 46. The second of the times 54 is located in a fixed time period 56 after the first of the two times 54.

In an adjoining third working step 58, an operating mode 60 of the hearing device 4 is set based on the time profile 50 of the decrease. When the voltage 44 decreases in this case more rapidly than a second limit value 62, a working mode is used as the operating mode 60. The second limit value 62 is undershot in this case when the user manually moves the hearing device 4 away from the charging device 28. In this case, the user usually wishes to subsequently use the hearing device 4. When setting the working mode, the electronics 10, specifically the signal processing unit, the amplifier circuit and the signal processor, are set to an operating mode in which there is an increased energy demand. Any settings stored in software or a memory are also loaded so that the hearing device 4 is ready for use when the user applies the device to the body.

When the hearing device 4 is removed from the charging device 28, first the coil 36 of the charging device 28 also continues to be supplied with the AC voltage in an unaltered manner by using the inverter 34, in such a way that the AC voltage produces the electrical field. However, less voltage is induced in the coil 26 of the hearing device 4 due to the increasing distance. As a result, the voltage 44 applied to the contacts 20 decreases to 0 V. Since the hearing device 4 is removed relatively abruptly from the charging device 28, the interaction between the devices is also ended relatively abruptly. In other words, the energy transmission between the charging device 28 and the hearing device 4 is ended abruptly.

Figure 3:
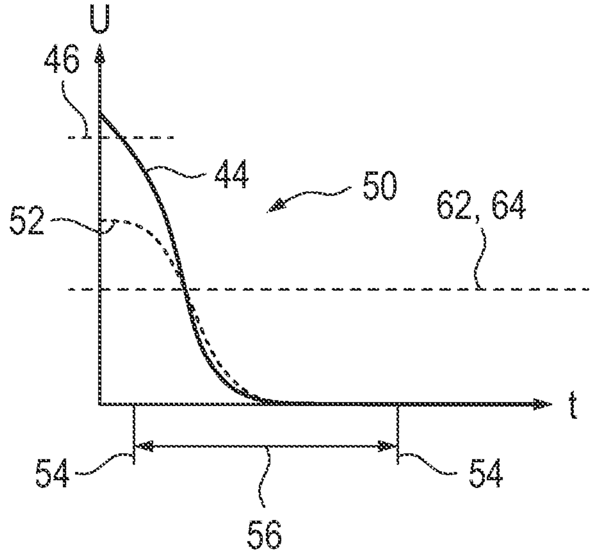
FIGS. 3 and 4 are diagrams showing different time profiles of a voltage applied to two electrical contacts of the hearing device.

In one variant, a particular value for the derivation 52 is used as the second limit value 62, that value being exceeded by the derivation 52 in the example shown in FIG. 3. In other words, the second limit value 62 is exceeded when the derivation 52 is greater than the second limit value 62 and thus the voltage 44 decreases relatively quickly to 0 V. If the time profile 50 is ascertained based on the voltage 44 detected at the two times 54, the second limit value 62 is exceeded when the difference between the two detected voltages 44 is greater than a determined value corresponding thereto.

In contrast, if the plug 32 is removed from the supply network and the position of the two coils 26, 36 with respect to one another is not changed, the capacitance 38 is no longer fed by the further rectifier 30. However, the inverter 34 will continue to be operated for a longer time due to the voltage applied to the capacitance 38 and the electrical energy stored thereby. As a result, energy also continues to be transmitted from the charging device 28 to the hearing device 4, wherein, however, the voltage induced in the coil 26 decreases slowly, in such a way that the voltage 44 applied to the contacts 20 also decreases relatively slowly.

Figure 4:
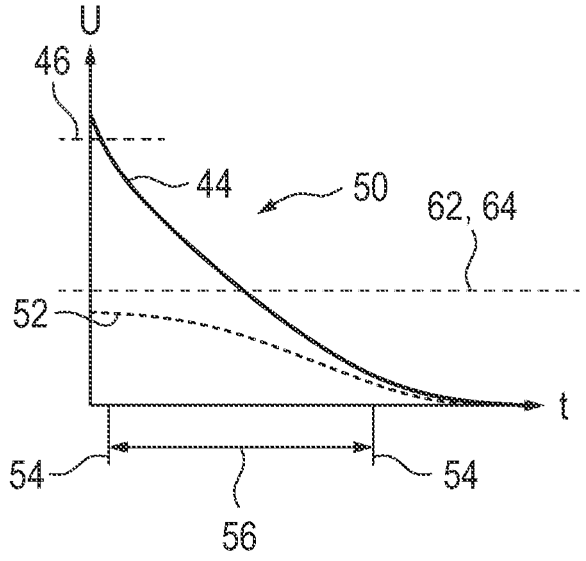

As a result, as illustrated in FIG. 4, the derivation 52 is below the second limit value 62, which is selected to be equal to a first limit value 64. In other words, the two limit values 62, 64 are equal. The difference in the voltage 44 detected at the times is also greater than the corresponding determined value. In this case, a standby operating mode is selected as the operating mode 60. In summary, the standby operating mode is selected when the voltage 44 decreases more slowly than the first limit value 64. In standby operating mode, the electronics 10 are operated in an operating mode in which an energy demand is reduced, provided this is not already the case. For this purpose, for example, the amplifier circuit, the signal processing circuit and/or the signal processor are completely switched off. The regulation unit is also switched off. As a result, an energy demand of the hearing device 4 is reduced and the device can be stored over a relatively long period of time. When the user would like to use the hearing device 4, it is necessary to set it to working mode, which is done by using a corresponding input, in particular the actuation of a switch.

The invention is not restricted to the exemplary embodiment described above. Rather, other variants of the invention may also be derived therefrom by a person skilled in the art, without departing from the subject matter of the invention. In particular, it is also the case that all individual features described in conjunction with the exemplary embodiment may also be combined with one another in some other way without departing from the subject matter of the invention.

The following is a summary list of reference numerals and the corresponding structure used in the above description of the invention.

LISTED OF REFERENCE SIGNS

2 System
4 Hearing device
6 Hearing device housing
8 Microphone
10 Electronics
12 Receiver
14 Battery
16 Charging circuit
18 Charging terminal
20 Contact
21 A/D converter
22 Capacitor
24 Rectifier
26 Coil
28 Charging device
28' Mating contact
30 Further rectifier
32 Plug
34 Inverter
36 Coil of the charging device
38 Capacitance
40 Method
42 First working step
44 Voltage
46 Third limit value
48 Second working step
50 Time profile
52 Derivation
54 Time
56 Time period
58 Third working step
60 Operating mode
62 Second limit value
64 First limit value

The invention claimed is:

1. A method for operating a hearing device, the method comprising:

providing a hearing device including a charging terminal with two electrical contacts;

charging the hearing device by an interaction with a charging device applied to the two electrical contacts;

detecting a decrease in a voltage applied to one of said two electrical contacts due to the interaction with the charging device; and setting different operating modes of the hearing device based on a time profile of the decrease by:

selecting one of the operating modes as a standby operating mode when the voltage decreases more slowly than a first limit value during non-use of the hearing device by a user, and switching off at least some components of the hearing device or operating at least one of the components with a comparatively low energy demand with a restricted range of functions, in the standby operating mode; and selecting another of the operating modes as a working mode when the voltage decreases more rapidly than a second limit value during use of the hearing device by a user, and energizing some of the components of the hearing device having not yet been energized and switching the components having not yet been energized from the standby operating mode to the working mode.

2. The method according to claim 1, which further comprises determining the time profile by detecting the voltage only at two different times.

3. The method according to claim 1, which further comprises producing a temporal derivation of the voltage to determine the time profile.

4. The method according to claim 1, which further comprises detecting a decrease when the voltage applied to the two contacts falls below a third limit value.

5. A hearing device, comprising:

a charging terminal having two electrical contacts; and electronics operating the hearing device in accordance with the method of claim 1.

6. The hearing device according to claim 5, which further comprises an A/D converter for ascertaining the time profile of the decrease.

7. A system, comprising:

a charging device having two electrical mating contacts;

a capacitance electrically interconnecting said two electrical mating contacts; and a hearing device according to claim 5.

* * * * *